United States Patent
Frickey, III et al.

(10) Patent No.: US 10,067,829 B2
(45) Date of Patent: Sep. 4, 2018

(54) MANAGING REDUNDANCY INFORMATION IN A NON-VOLATILE MEMORY

(71) Applicant: INTEL CORPORATION, Santa Clara, CA (US)

(72) Inventors: Robert E. Frickey, III, Sacramento, CA (US); Wei Fang, El Dorado Hills, CA (US); Ning Wu, Folsom, CA (US)

(73) Assignee: INTEL CORPORATION, Santa Clara, CA (US)

( * ) Notice: Subject to any disclaimer, the term of this patent is extended or adjusted under 35 U.S.C. 154(b) by 47 days.

(21) Appl. No.: 14/106,571

(22) Filed: Dec. 13, 2013

(65) Prior Publication Data

US 2015/0169405 A1 Jun. 18, 2015

(51) Int. Cl.
G06F 11/10 (2006.01)
G06F 12/02 (2006.01)

(52) U.S. Cl.
CPC ........ G06F 11/1076 (2013.01); G06F 11/108 (2013.01); G06F 12/0246 (2013.01);
(Continued)

(58) Field of Classification Search
CPC .. G06F 11/108; G06F 11/1048; H03M 13/353
See application file for complete search history.

(56) References Cited

U.S. PATENT DOCUMENTS 7,200,715 B2 4/2007 Kleiman
8,095,577 B1 1/2012 Faibish
(Continued)

FOREIGN PATENT DOCUMENTS

| CN | 103198870 A | 7/2013 |
|---|---|---|
| KR | 10-2009-0129416 A | 12/2009 |
| WO | 2008121306 A2 | 10/2008 |

OTHER PUBLICATIONS

Pan, W., et al., "SPD-RAID4: Splitting Parity Disk for RAID4 Structured Parallel SSD Arrays," 2013 IEEE International Conference on High Performance Computing and Communications & 2013 IEEE International Conference on Embedded and Ubiquitous Computing, Nov. 13, 2013, pp. 9-16.
(Continued)

*Primary Examiner* — Joseph D Torres
(74) *Attorney, Agent, or Firm* — Schwabe, Williamson & Wyatt, P.C.

(57) ABSTRACT

Embodiments include apparatuses, method, and systems for organizing individual memory dice of a memory device into a plurality of virtual dice and designating one of the virtual dice of the memory device for storage of redundancy information. In one embodiment, a memory controller includes memory allocation logic to organize memory resources of individual memory dice of a memory device into a plurality of virtual dice, including a redundancy virtual die for storing redundancy information and a plurality of data virtual dice for storing data. The memory controller may further include input/output logic to write data to the data virtual dice of the non-volatile memory device, and redundancy information logic to generate redundancy information based on the data and to write the redundancy information to the redundancy virtual die of the non-volatile memory device.

21 Claims, 4 Drawing Sheets

(52) U.S. Cl.
CPC ............... *G06F 2212/1032* (2013.01); *G06F 2212/7207* (2013.01)

(56) References Cited

U.S. PATENT DOCUMENTS

| | | | |
|---|---|---|---|
| 8,130,554 B1 | 3/2012 | Linnell | |
| 8,195,978 B2 | 6/2012 | Flynn | |
| 8,234,545 B2* | 7/2012 | Shalvi et al. | 714/768 |
| 8,281,227 B2 | 10/2012 | Thatcher | |
| 8,307,258 B2 | 11/2012 | Flynn | |
| 8,468,244 B2 | 6/2013 | Redlich | |
| 8,533,550 B2 | 9/2013 | Khan | |
| 8,543,758 B2 | 9/2013 | Larson | |
| 8,949,684 B1* | 2/2015 | Shalvi et al. | 714/763 |
| 2009/0164690 A1 | 6/2009 | Slaight | |
| 2009/0180339 A1* | 7/2009 | Kim et al. | 365/200 |
| 2010/0017650 A1* | 1/2010 | Chin et al. | 714/6 |
| 2010/0115376 A1 | 5/2010 | Shalvi et al. | |
| 2010/0162065 A1* | 6/2010 | Norman | 714/746 |
| 2010/0199134 A1* | 8/2010 | Asnaashari et al. | 714/718 |
| 2010/0332749 A1 | 12/2010 | Benhase et al. | |
| 2011/0066882 A1* | 3/2011 | Walls et al. | 714/6.24 |
| 2011/0126045 A1 | 5/2011 | Bennett | |
| 2011/0252289 A1* | 10/2011 | Patapoutian et al. | 714/763 |
| 2011/0258380 A1* | 10/2011 | Goss et al. | 711/114 |
| 2011/0302358 A1* | 12/2011 | Yu et al. | 711/103 |
| 2012/0131381 A1 | 5/2012 | Eleftheriou | |
| 2012/0213005 A1 | 8/2012 | Lee | |
| 2012/0221922 A1 | 8/2012 | Bennett | |
| 2012/0324148 A1* | 12/2012 | Stonelake et al. | 711/103 |
| 2013/0019057 A1 | 1/2013 | Stephens | |
| 2013/0024746 A1* | 1/2013 | Sharon et al. | 714/766 |
| 2013/0031429 A1* | 1/2013 | Sharon et al. | 714/718 |
| 2013/0036327 A1 | 2/2013 | Flynn | |
| 2013/0060981 A1 | 3/2013 | Horn | |
| 2013/0073895 A1 | 3/2013 | Cohen | |
| 2013/0086336 A1 | 4/2013 | Canepa | |
| 2013/0205102 A1 | 8/2013 | Jones | |
| 2013/0268824 A1 | 10/2013 | Shalvi et al. | |
| 2014/0129874 A1* | 5/2014 | Zaltsman et al. | 714/6.11 |
| 2014/0156966 A1* | 6/2014 | Ellis et al. | 711/173 |
| 2014/0189421 A1* | 7/2014 | Werner et al. | 714/6.21 |

OTHER PUBLICATIONS

International Search Report and Written Opinion dated Feb. 10, 2015, in corresponding International Application No. PCT/US2014/065826, 15 pages.

International Preliminary Report on Patentability dated Jun. 23, 2016, issued in corresponding International Application No. PCT/US2014/065826, 8 pages.

\* cited by examiner

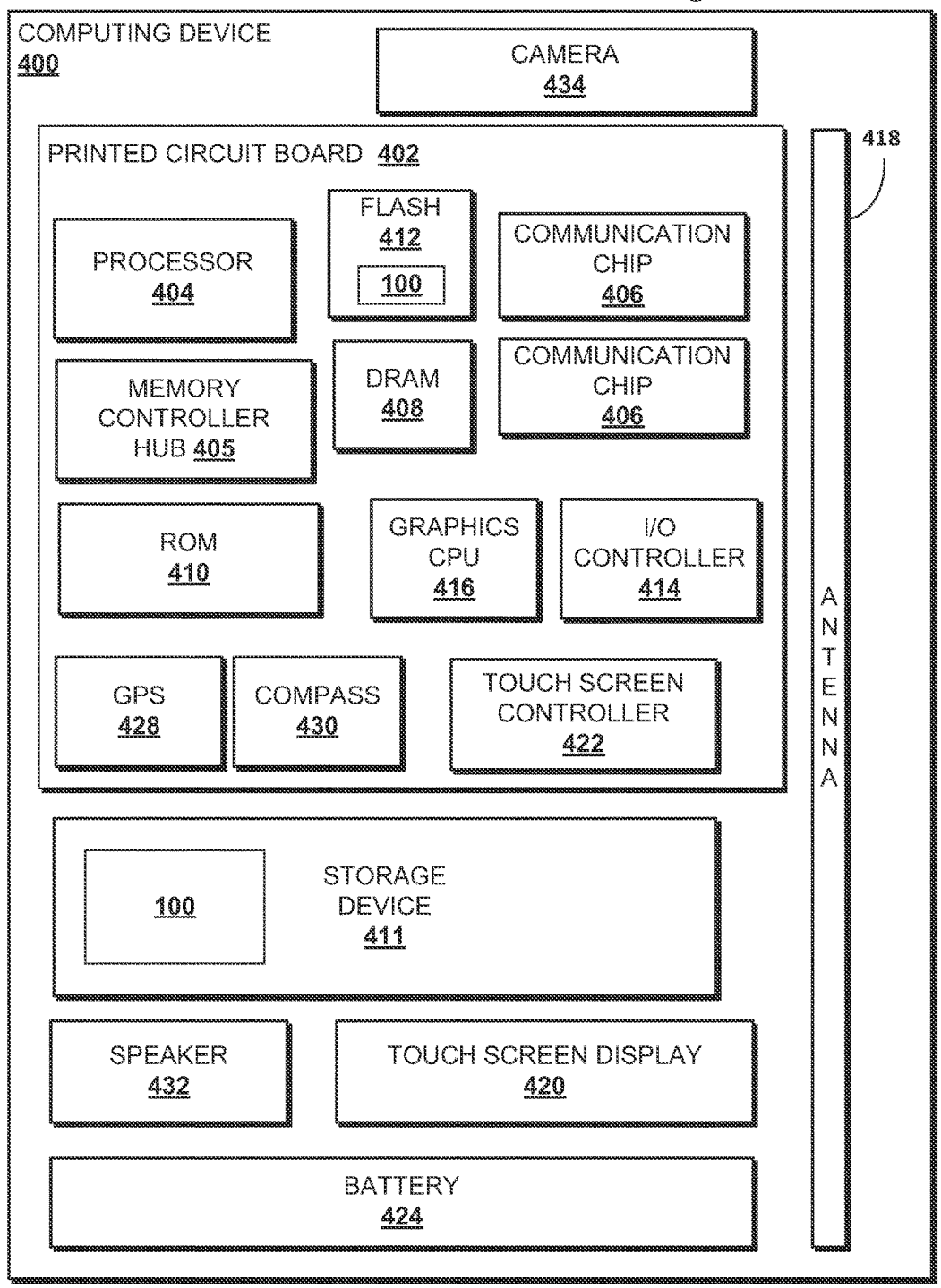

MANAGING REDUNDANCY INFORMATION IN A NON-VOLATILE MEMORY

FIELD

Embodiments of the present invention relate generally to the technical field of memory. Specific embodiments relate to a portion of a non-volatile memory dedicated to storing redundancy information.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Solid state drives (SSDs) are built using a plurality of flash memory dice (e.g., NAND flash memory dice). In some drives, one of the memory dice is used to store redundancy information, for example, parity data consisting of a running Exclusive OR (XOR) total for corresponding blocks of data of the other memory dice. This parity data may be used to recover data in the event of a defect on one of the memory dice. However, an entire memory die must be dedicated for storage of parity data.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 4 illustrates an example system configured to employ the apparatuses and methods described herein, in accordance with various embodiments.

DETAILED DESCRIPTION

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable hardware components that provide the described functionality. As used herein, "computer-implemented method" may refer to any method executed by one or more processors, a computer system having one or more processors, a mobile device such as a smartphone (which may include one or more processors), a tablet, laptop computer, a set-top box, a gaming console, and so forth.

Figure 1:
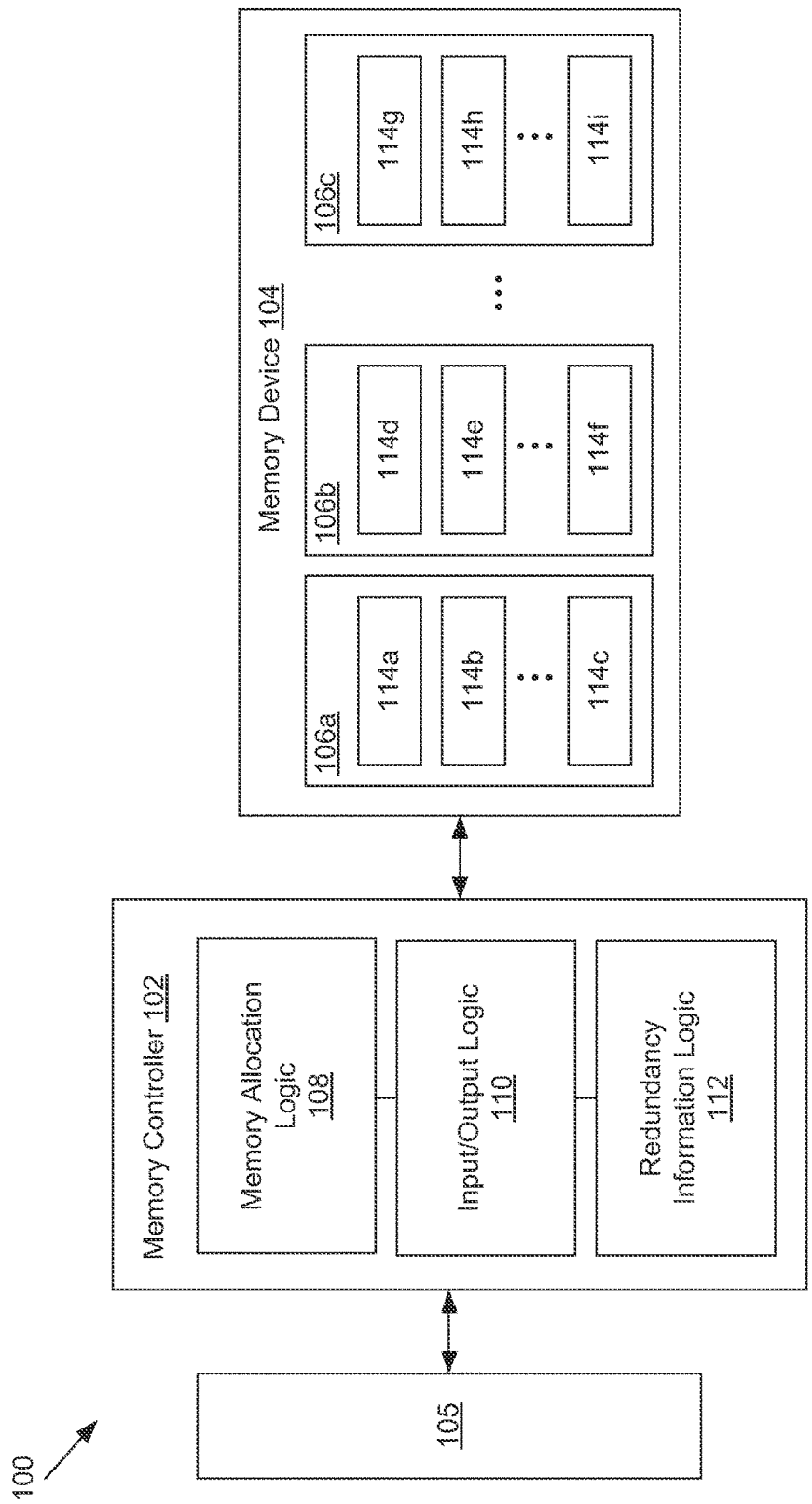
FIG. 1 illustrates an example memory system including a memory controller and a memory device, in accordance with various embodiments.

FIG. 1 illustrates a memory system 100 in accordance with various embodiments. In some embodiments, the memory system 100 may implement a solid state drive (SSD). The memory system 100 may include a memory controller 102, a non-volatile memory device 104, and a host interface 105.

The memory device 104 may implement any suitable form of non-volatile memory. For example, in some embodiments, the memory device 104 may include NAND flash memory. In other embodiments, the memory device 104 may include another type of memory, such as a phase change memory (PCM), a three-dimensional cross point memory array, a resistive memory, nanowire memory, ferro-electric transistor random access memory (FeTRAM), magnetoresistive random access memory (MRAM) that incorporates memristor technology, spin transfer torque (STT)-MRAM, etc.

The memory controller 102 may control writing data into the memory device 104 and/or reading data from the memory device 104. The host interface 105 may interface with a host device (e.g., a processor, not shown) to allow the host device to write data into the memory device 104 and/or read data from the memory device 104 via the memory controller 102. The host interface 105 may communicate with the host device using one or more communication interface protocols, such as a Serial Advanced Technology Attachment (SATA), Peripheral Component Interconnect express (PCIe), Serial Attached SCSI (SAS), and/or Universal Serial Bus (USB) interface.

In some embodiments, the memory controller 102, memory device 104 and host interface 105 may be included in a same package. For example, the memory controller 102, memory device 104, and host interface 105 may be disposed on a same printed circuit board.

In various embodiments, the memory device 104 may include a plurality of memory dice 106*a-c*. The memory dice 106*a-c* may include memory resources formed on separate pieces of substrate (e.g., silicon) from one another. The memory device 104 may include any suitable number of two or more memory dice 106*a-c*.

In various embodiments, memory resources of the individual memory dice 106*a-c* may be organized into a plurality of blocks of the memory die. In some embodiments, the memory dice 106*a-c* may be multi-plane memory dice having memory resources (e.g., blocks) arranged in multiple planes, such as 2 or 4 planes. For example, for a three-dimensional space having orthogonal x-, y-, and z-axes, memory resources of a given plane may have a same position with respect to the z-axis and different positions with respect to the x- and/or y-axis. The memory resources of different planes may have different positions with respect to the z-axis. Operations, such as reading, writing, and/or erasing of data, may be performed independently and concurrently on multiple planes of the same memory die 106*a-c*. In other embodiments, one or more of the memory dice 106*a-c* may be single plane memory dice.

The individual blocks of each memory die 106*a-c* may include a plurality of pages. In some embodiments, a page may correspond to a granularity of data that may be addressed (e.g., for reading and/or writing) by the memory controller 102. A page may include a plurality of memory elements (e.g., memory cells) that each store a single bit of data.

In various embodiments, the memory controller 102 may include memory allocation logic 108, input/output logic 110 and redundancy information logic 112 coupled to one another at least as shown. The memory allocation logic 108 may organize the memory resources of individual memory dice 106*a-c* of the memory device 104 into a plurality of virtual dice 114*a-i*. For example, the memory allocation logic 108 may allocate the memory resources of individual memory dice 106*a-c* among a plurality of virtual dice 114*a-i* associated with the respective memory die 106*a-c*. By "virtual" die, it is meant that the memory controller 102 may treat different virtual dice 114*a-i* as separate groups of memory resources for the purposes of managing redundancy information, as further discussed below, even though multiple virtual dice may be disposed on the same physical die (e.g., memory dice 106*a-c*). In various embodiments, the memory allocation logic 108 may designate virtual die 114*i* as a redundancy virtual die for storing redundancy information. Accordingly, the virtual die 114*i* may be referred to as the redundancy virtual die 114*i*. The memory allocation logic 108 may designate the remaining virtual dice (e.g., 114*a-h*) apart from the redundancy virtual die 114*i* as data virtual dice for storing data. Accordingly, the virtual dice 114*a-h* may be referred to as data virtual dice 114*a-h*.

In various embodiments, the input/output logic 110 may receive data (e.g., from a processor) for storage in the memory device 104. The input/output logic 110 may write the data to the data virtual dice 114*a-h*.

In various embodiments, the redundancy information logic 112 may generate redundancy information based on the data stored in the data virtual dice 114*a-h*. The redundancy information logic 112 may write the redundancy information to the redundancy virtual die 114*i* of the memory device 104. For example, the redundancy information logic 112 may define a plurality of stripes of the memory device 104, with each stripe including memory resources of each of the plurality of data virtual dice 114*a-h*. For example, each stripe may include a page from each of the plurality of data virtual dice 114*a-h*. The redundancy information logic 112 may generate redundancy information for individual stripes and may write the redundancy information for the stripe to corresponding memory resources (e.g., a corresponding page) of the redundancy virtual die 114*i*. The redundancy information may include information that may be used to recover data stored in one or more memory resources of the stripe in the event that the memory resources fail. In some embodiments, the redundancy information may include parity information. For example, the redundancy information stored in a given memory resource (e.g., page) of the redundancy virtual die 114*i* may include an XOR total of the data stored in the corresponding memory resources of the associated stripe. The XOR total may be the result of performing an XOR operation on the data stored in each page of the stripe.

In various embodiments, the use of one virtual die 114*i*, rather than an entire memory die, for storing redundancy information may use fewer memory resources of the memory device 104 for storing redundancy information. For example, for memory dice 106*a-c* divided into a number N of virtual dice 114*a-c*, the memory device 104 may use 1/N of one memory die for storing redundancy information. A higher number N of virtual dice per memory die may use fewer memory resources of the memory device 104 for storing redundancy data, but may also be more limited in the size and/or type of defects of the memory device 104 that are correctable using the redundancy information. Accordingly, the number N may be selected based on the needs of the memory system 100 and/or the size of the memory device 104 (e.g., number of memory dice 106*a-c* in the memory device 104 and/or the storage capacity of each memory die 106*a-c*).

In some embodiments, the individual stripes may include pages of the plurality of data virtual dice 114*a-h* that have a same page index. Additionally, the redundancy information for the stripe may be stored in the page of the redundancy virtual die 114*i* with the same page index. Thus, the individual stripes may include pages of different blocks of a same memory die 106*a-c* with the same page index.

Figure 2:
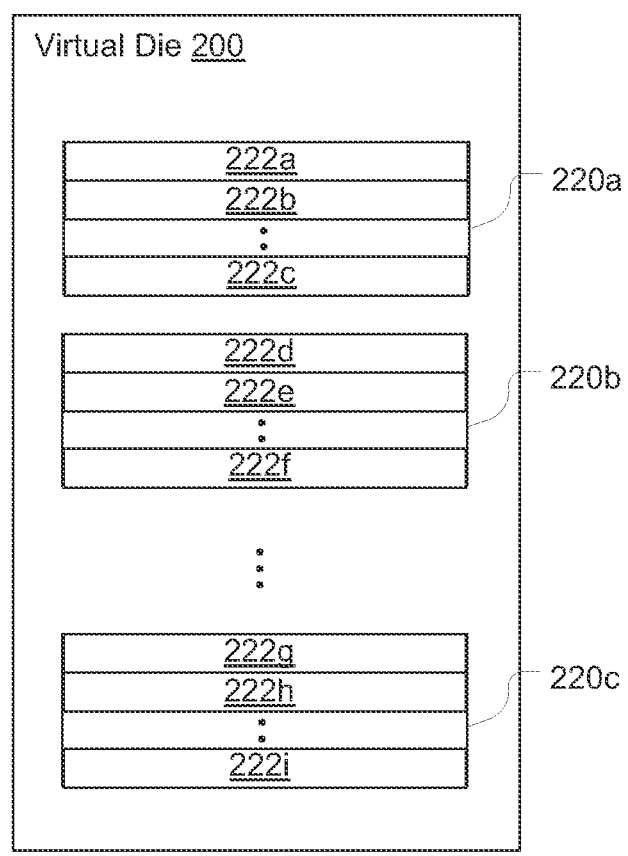
FIG. 2 illustrates an example virtual die, in accordance with various embodiments.

For example, FIG. 2 illustrates a virtual die 200, which may embody any of the virtual dice 114*a-i*. The virtual die 200 may include a plurality of blocks 220*a-c*. The blocks 220*a-c* included in virtual die 200 may be a subset of less than all blocks of a memory die associated with the virtual die 200 (e.g., memory die 106*a-c*).

The individual blocks 220*a-c* may include a plurality of pages 222*a-i*. Each block 220*a-c* may have an associated block index and each page 222*a-i* may have an associated page index. As discussed above, in some embodiments, the redundancy information logic 112 may define a stripe that includes one page 222*a-i* from each of a plurality of virtual memory dice 200. In some embodiments, the pages 222*a-i* in the stripe may have a same page index. The redundancy information logic 112 may generate redundancy information (e.g., an XOR total) for data stored in the pages of the stripe and store the redundancy information in a corresponding page of a redundancy virtual die (e.g., redundancy virtual die 114*i*). The redundancy information logic 112 may update the redundancy information as new data is written to the data virtual dice.

In various embodiments, the virtual die 200 may include blocks 220*a-c* having any suitable arrangement within the associated memory die. For example the virtual die 200 may include blocks 220*a-c* on multiple planes of the memory die (e.g., blocks on different planes that overlap with one another). This may allow the memory controller 102 to recover defects that span multiple planes of the memory die. In this example, blocks 220a-c within each plane may be divided among different virtual dice 200.

Alternatively, the blocks 220a-c of the virtual die 200 may all be included in the same plane of the associated memory die. Accordingly, in a multi-plane memory die, the blocks of different planes may be included in different virtual dice. In some embodiments, the virtual dice 200 may be divided both according to the plane of the blocks and within each plane. In these embodiments, the blocks 220a-c of the virtual die 200 may all be in the same plane of the memory die and may be a subset of less than all the blocks of the plane.

Referring again to FIG. 1, in various embodiments, the input/output logic 110 may read data from the memory device 104 (e.g., from the data virtual dice 114a-h). In some cases, the input/output logic 110 may detect an error in the read data (e.g., based on the redundancy information). The input/output logic 110 may correct the error in the read data based on the associated redundancy information stored in the redundancy virtual die 114i. For example, if there is a defect that affects one page of a stripe, the redundancy information associated with the stripe may be used to determine the correct data for the affected page.

Accordingly, the memory controller 102 may recover from defects that affect one or more blocks of the memory die 106a-c, but not the entire memory die 106a-c. Additionally, as discussed above, under arrangements in which each virtual die spans multiple planes of the memory device 104 (e.g., blocks of different planes that overlap one another), the memory controller 102 may recover from defects in one of the memory dice 106a-c that span multiple planes.

Figure 3:
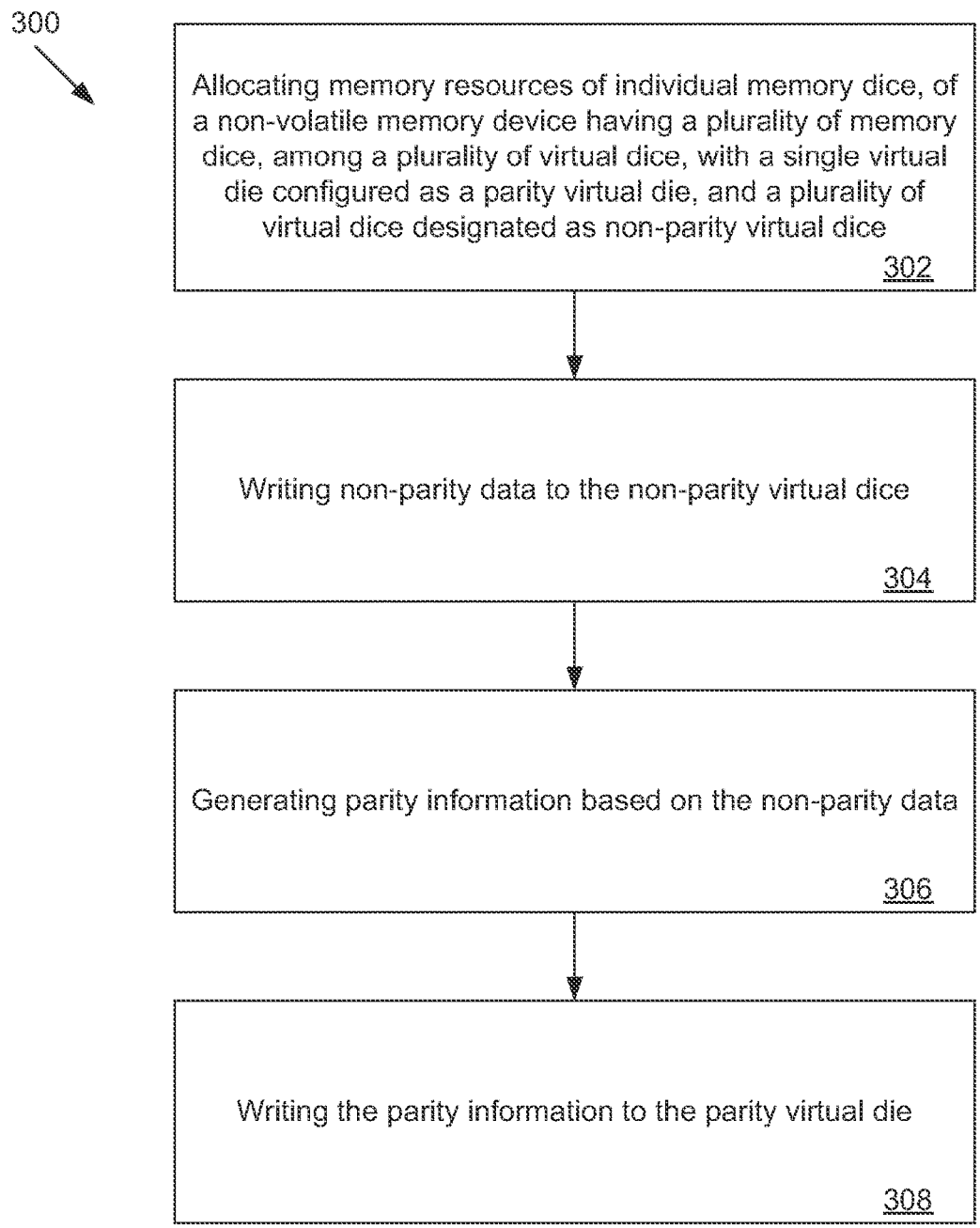
FIG. 3 illustrates an example method for operating a memory controller, in accordance with various embodiments.

FIG. 3 illustrates a method 300 that may be performed by a memory controller (e.g., memory controller 102) in accordance with various embodiments.

At 302, the method 300 may include allocating memory resources of individual memory dice (e.g., memory dice 106a-c), of a non-volatile memory device (e.g., memory device 104) having a plurality of memory dice, among a plurality of virtual dice (e.g., virtual dice 114a-i). For example, the memory resources of an individual memory die may be distributed among a plurality of virtual dice associated with the memory die. A single virtual die (e.g., virtual die 114i) of the non-volatile memory device may be designated as a redundancy virtual die for storing redundancy information, and the plurality of virtual dice of the non-volatile memory device apart from the redundancy virtual die may be designated as data virtual dice (e.g., data virtual dice 114a-h) for storing data.

At 304, the method 300 may include writing data to the data virtual dice.

At 306, the method 300 may include generating redundancy information based on the data. For example, the redundancy information may be generated for a stripe that includes memory resources (e.g., one or more pages) of each of the plurality of data virtual dice.

At 308, the method 300 may include writing the redundancy information to the redundancy virtual die of the non-volatile memory device.

FIG. 4 illustrates an example computing device 400 which may employ the apparatuses and/or methods described herein (e.g., memory system 100, virtual die 200, method 300), in accordance with various embodiments. As shown, computing device 400 may include a number of components, such as one or more processor(s) 404 (one shown) and at least one communication chip 406. In various embodiments, the one or more processor(s) 404 each may include one or more processor cores. In various embodiments, the at least one communication chip 406 may be physically and electrically coupled to the one or more processor(s) 404. In further implementations, the communication chip 406 may be part of the one or more processor(s) 404. In various embodiments, computing device 400 may include printed circuit board (PCB) 402. For these embodiments, the one or more processor(s) 404 and communication chip 406 may be disposed thereon. In alternate embodiments, the various components may be coupled without the employment of PCB 402.

Depending on its applications, computing device 400 may include other components that may or may not be physically and electrically coupled to the PCB 402. These other components include, but are not limited to, memory controller hub 405, volatile memory (e.g., DRAM 408), non-volatile memory such as read only memory 410 (ROM), flash memory 412, and storage device 411 (e.g., an SSD or a hard-disk drive (HDD)), an I/O controller 414, a digital signal processor (not shown), a crypto processor (not shown), a graphics processor 416, one or more antenna 418, a display (not shown), a touch screen display 420, a touch screen controller 422, a battery 424, an audio codec (not shown), a video codec (not shown), a global positioning system (GPS) device 428, a compass 430, an accelerometer (not shown), a gyroscope (not shown), a speaker 432, a camera 434, and a mass storage device (such as hard disk drive, a solid state drive, compact disk (CD), digital versatile disk (DVD))(not shown), and so forth. In various embodiments, the processor 404 may be integrated on the same die with other components to form a System on Chip (SoC).

In various embodiments, the flash memory 412 and/or storage device 411 may implement the memory system 100 described herein. The computing device 400 may include the storage device 411 in addition to, or instead of, the flash memory 412. In some embodiments, such as embodiments in which the storage device 411 implements an SSD, the storage device 411 may implement the memory system 100 described herein in addition to or instead of the flash memory 412.

In some embodiments, the one or more processor(s), flash memory 412, and/or storage device 411 may include associated firmware (not shown) storing programming instructions configured to enable computing device 400, in response to execution of the programming instructions by one or more processor(s) 404, to practice all or selected aspects of the methods described herein (e.g., method 300). In various embodiments, these aspects may additionally or alternatively be implemented using hardware separate from the one or more processor(s) 404, flash memory 412, or storage device 411.

The communication chips 406 may enable wired and/or wireless communications for the transfer of data to and from the computing device 400. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 406 may implement any of a number of wireless standards or protocols, including but not limited to IEEE 702.20, General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Bluetooth, derivatives thereof, as well as any other wireless protocols that are designated as 3G, 4G, 5G, and beyond. The computing device 400 may include a plurality of communication chips 406. For instance, a first communication chip 406 may be dedicated to shorter range wireless communications such as Wi-Fi and Bluetooth and a second communication chip 406 may be dedicated to longer range wireless communications such as GPS, EDGE, GPRS, CDMA, WiMAX, LTE, Ev-DO, and others.

In various implementations, the computing device 400 may be a laptop, a netbook, a notebook, an ultrabook, a smartphone, a computing tablet, a personal digital assistant (PDA), an ultra-mobile PC, a mobile phone, a desktop computer, a server, a printer, a scanner, a monitor, a set-top box, an entertainment control unit (e.g., a gaming console or automotive entertainment unit), a digital camera, an appliance, a portable music player, or a digital video recorder. In further implementations, the computing device 400 may be any other electronic device that processes data.

EXAMPLES

Some non-limiting examples are provided below.

Example 1 includes a memory controller comprising memory allocation logic to allocate memory resources of individual memory dice, of a non-volatile memory device having a plurality of memory dice, among a plurality of virtual dice associated with the individual memory die, with a first virtual die of the non-volatile memory device configured as a redundancy virtual die designated for storing redundancy information, and a plurality of virtual dice of the non-volatile memory device configured as data virtual dice designated for storing data; input/output logic to write data to the data virtual dice of the non-volatile memory device; and redundancy information logic to generate redundancy information based on the data and to write the redundancy information to the redundancy virtual die of the non-volatile memory device.

Example 2 includes the memory controller of Example 1, wherein the redundancy information logic is to generate the redundancy information for a stripe including memory resources of each of the plurality of data virtual dice.

Example 3 is the memory controller of Example 2, wherein the stripe includes a page from each of the plurality of virtual dice.

Example 4 is the memory controller of Example 1, wherein individual virtual dice include memory resources from a plurality of planes of the memory die associated with the respective virtual die.

Example 5 is the memory controller of Example 1, wherein the input/output logic is further to read the data from the non-volatile memory device and correct an error in the read data based on the redundancy information.

Example 6 is the memory controller of Example 1, wherein the memory allocation logic is to configure all virtual memory dice of the non-volatile memory device apart from the first virtual die as data virtual dice.

Example 7 is the memory controller of Example 1, wherein the plurality of memory dice are flash memory dice.

Example 8 is a computing system including the memory controller of any one of Examples 1 to 7 and further comprising the non-volatile memory device.

Example 9 is the computing system of Example 8, further comprising a processor to provide data to the memory controller for storage in the non-volatile memory device.

Example 10 is a method for managing memory comprising: allocating memory resources of individual memory dice, of a non-volatile memory device having a plurality of memory dice, among a plurality of virtual dice associated with the respective individual memory die, with a single virtual die of the non-volatile memory device configured as a redundancy virtual die designated for storing redundancy information, and all virtual dice of the non-volatile memory device apart from the redundancy virtual die configured as data virtual dice designated for storing data; writing data to the data virtual dice of the non-volatile memory device; generating redundancy information based on the data; and writing the redundancy information to the redundancy virtual die of the non-volatile memory device.

Example 11 is the method of Example 10, wherein the redundancy information is generated for a stripe including memory resources of each of the plurality of data virtual dice.

Example 12 is the method of Example 11, wherein the stripe includes a page from each of the plurality of virtual dice.

Example 13 is the method of Example 10, wherein individual virtual dice include memory resources from a plurality of planes of the memory die associated with the respective virtual die.

Example 14 is the method of Example 10, further comprising: reading the data from the non-volatile memory device; and correcting an error in the read data based on the redundancy information.

Example 15 is a system for managing memory comprising: a processor to generate data; a non-volatile memory device including a plurality of memory dice; and a memory controller coupled to the processor and the non-volatile memory device. The memory controller includes: memory allocation logic to allocate memory resources of individual memory dice of the non-volatile memory device among a plurality of virtual dice associated with the respective individual memory die, with a single virtual die of the non-volatile memory device designated as a redundancy virtual die for storing redundancy information and the virtual dice of the non-volatile memory device apart from the redundancy virtual die designated as data virtual dice for storing data; input/output logic to write data to the data virtual dice of the non-volatile memory device; and redundancy information logic to generate redundancy information based on the data and to write the redundancy information to the redundancy virtual die of the non-volatile memory device.

Example 16 is the system of Example 15, wherein the redundancy information logic is to generate the redundancy information for a stripe including memory resources of each of the plurality of data virtual dice.

Example 17 is the system of Example 16, wherein the stripe includes a page from each of the plurality of virtual dice.

Example 18 is the system of Example 15, wherein individual virtual dice include memory resources from a plurality of planes of the memory die associated with the respective virtual die.

Example 19 is the system of Example 15, wherein the input/output logic is further to read the data from the non-volatile memory device and correct an error in the read data based on the redundancy information.

Example 20 is the system of Example 15, wherein the non-volatile memory device is a flash memory device.

Example 21 is the system of Example 15, wherein the system is a mobile communication device further including a touchscreen display.

Although certain embodiments have been illustrated and described herein for purposes of description, this application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. A memory system comprising:
   a non-volatile memory device having a plurality of physical memory dice; and
   a memory controller having
   memory allocation logic to allocate memory resources of the non-volatile memory device, wherein the memory allocation logic is to:
      organize the memory resources of individual memory dice of the non-volatile memory device into a plurality of virtual dice, wherein a virtual die of the plurality of virtual dice corresponds to a portion of a physical memory die, the virtual die includes multiple blocks, and a block of the multiple blocks includes multiple memory pages;
      designate a first virtual die of the plurality of virtual dice as a redundancy virtual die for storing redundancy information for the plurality of virtual dice, and
      designate remaining virtual dice of the plurality of virtual dice apart from the redundancy virtual die as data virtual dice for storing data;
   input/output logic to write data to the data virtual dice; and
   redundancy information logic to generate redundancy information and to write the redundancy information to the redundancy virtual die, wherein the redundancy information corresponds to data written to the data virtual dice.

2. The memory system of claim 1, wherein the redundancy information logic is to generate the redundancy information for a stripe including memory resources of each virtual die of the data virtual dice.

3. The memory system of claim 2, wherein the stripe includes a page from each virtual die of the data virtual dice.

4. The memory system of claim 1, wherein individual virtual dice include memory resources from a plurality of planes of the each physical memory die associated with a respective virtual die.

5. The memory system of claim 1, wherein the input/output logic is further to read data from the non-volatile memory device and correct an error in the read data based on the redundancy information.

6. The memory system of claim 1, wherein the plurality of physical memory dice are flash memory dice.

7. A method for operating a memory system comprising:
   allocating memory resources of a non-volatile memory device of a memory system having a plurality of physical memory dice, wherein
      the memory resources of individual memory dice of the non-volatile memory device are organized into a plurality of virtual dice, wherein a virtual die of the plurality of virtual dice corresponds to a portion of a physical memory die, the virtual die includes multiple blocks, and a block of the multiple blocks includes multiple memory pages,
      a first virtual die of the plurality of virtual dice is designated as a redundancy virtual die for storing redundancy information for the plurality of virtual dice, and
      rest of virtual dice of the plurality of virtual dice apart from the first virtual die are designated as data virtual dice for storing data;
   writing data to the data virtual dice;
   generating redundancy information based on data written to the data virtual dice; and
   writing the redundancy information to the redundancy virtual die.

8. The method of claim 7, wherein the redundancy information is generated for a stripe including memory resources of each virtual die of the data virtual dice.

9. The method of claim 8, wherein the stripe includes a page from each virtual die of the data virtual dice.

10. The method of claim 7, wherein individual virtual dice include memory resources from a plurality of planes of the each physical memory die associated with a respective virtual die.

11. The method of claim 7, further comprising:
   reading data from the non-volatile memory device; and
   correcting an error in the read data based on the redundancy information.

12. A system comprising:
   a processor;
   a non-volatile memory device including a plurality of physical memory dice; and
   a memory controller coupled to the processor and the non-volatile memory device, the memory controller including:
      memory allocation logic to allocate memory resources of the non-volatile memory device having a plurality of physical memory dice, wherein the memory allocation logic is to:
         organize the memory resources of individual memory dice of the non-volatile memory device into a plurality of virtual dice, wherein a virtual die of the plurality of virtual dice corresponds to a portion of a physical memory die, the virtual die includes multiple blocks, and a block of the multiple blocks includes multiple memory pages;
         designate a single virtual die of the plurality of virtual dice as a redundancy virtual die for storing redundancy information for the plurality of virtual dice, and
         designate remaining virtual dice of the plurality of virtual dice apart from the redundancy virtual die as data virtual dice for storing data;
      input/output logic to write data to the data virtual dice; and
      redundancy information logic to generate redundancy information based on data and to write the redundancy information to the redundancy virtual die, wherein the redundancy information corresponds to data written to the data virtual dice.

13. The system of claim 12, wherein the redundancy information logic is to generate the redundancy information for a stripe including memory resources of each virtual die of the data virtual dice.

14. The system of claim 13, wherein the stripe includes a page from each virtual die of the data virtual dice.

15. The system of claim 12, wherein individual virtual dice include memory resources from a plurality of planes of the each physical memory die associated with a respective virtual die.

16. The system of claim 12, wherein the input/output logic is further to read data from the non-volatile memory device and correct an error in the read data based on the redundancy information.

17. The system of claim 12, wherein the non-volatile memory device is a flash memory device.

18. The system of claim 12, wherein the system is a mobile communication device further including a touchscreen display.

19. A non-volatile memory device, comprising:
a plurality of physical memory dice, wherein the plurality of physical memory dice are organized into a plurality of virtual dice, a virtual die of the plurality of virtual dice corresponds to a portion of a physical memory die, the virtual die includes multiple blocks, and a block of the multiple blocks includes multiple memory pages;
a redundancy virtual die, wherein the redundancy virtual die is a virtual die of the plurality of virtual dice designated for storing redundancy information for the plurality of virtual dice, and
data virtual dice designated for storing data, wherein the data virtual dice are remaining virtual dice of the plurality of virtual dice apart from the redundancy virtual die.

20. The non-volatile memory device of claim 19, wherein the redundancy virtual die includes redundancy information for a stripe including memory resources of each virtual die of the data virtual dice.

21. The non-volatile memory device of claim 19, wherein the non-volatile memory device is a flash memory device.

* * * * *